(12) United States Patent
Jung et al.

(10) Patent No.: US 9,560,376 B2
(45) Date of Patent: Jan. 31, 2017

(54) METHOD FOR PROCESSING A MOTION INFORMATION ITEM, ENCODING AND DECODING METHODS, CORRESPONDING DEVICES, SIGNAL AND COMPUTER PROGRAM

(75) Inventors: Joël Jung, Le Mesnil Saint Denis (FR); Julien Le Tanou, Meudon (FR); Jean-Marc Thiesse, Paris (FR)

(73) Assignee: FRANCE TELECOM, Paris (FR)

( * ) Notice: Subject to any disclaimer, the term of this patent is extended or adjusted under 35 U.S.C. 154(b) by 760 days.

(21) Appl. No.: 13/642,779

(22) PCT Filed: Apr. 19, 2011

(86) PCT No.: PCT/FR2011/050898
§ 371 (c)(1),
(2), (4) Date: Oct. 22, 2012

(87) PCT Pub. No.: WO2011/131903
PCT Pub. Date: Oct. 27, 2011

(65) Prior Publication Data
US 2013/0039425 A1    Feb. 14, 2013

(30) Foreign Application Priority Data
Apr. 22, 2010    (FR) ...................... 10 53060

(51) Int. Cl.
*H04N 7/32*     (2006.01)
*H04N 19/513*   (2014.01)
(Continued)

(52) U.S. Cl.
CPC ............ *H04N 19/521* (2014.11); *H04N 19/52* (2014.11); *H04N 19/567* (2014.11); *H04N 19/61* (2014.11)

(58) Field of Classification Search
CPC ...................................................... H04N 19/52
(Continued)

(56) References Cited

U.S. PATENT DOCUMENTS

| 6,178,265 | B1 | 1/2001 | Haghighi |
| 8,000,392 | B1 * | 8/2011 | Krupiczka ............. H04N 19/56 375/240.12 |

(Continued)

FOREIGN PATENT DOCUMENTS

DE    102006043707 A1    3/2008

OTHER PUBLICATIONS

International Search Report for PCT/FR2011/050898 dated Aug. 1, 2011.
(Continued)

*Primary Examiner* — William C Vaughn, Jr.
*Assistant Examiner* — Luis Perez Fuentes
(74) *Attorney, Agent, or Firm* — David D. Brush; Westman, Chmaplin & Koehler, P.A.

(57) ABSTRACT

A method and apparatus are provided for processing movement information relating to a regular image of a sequence of images. The method includes: a step of building a list including at least one expected piece of movement information and at least one unexpected piece of movement information; a first step of associating expected movement information with movement information according to a first rule for optimizing the cost of encoding the movement information to be encoded; a second step of associating each unexpected piece of movement information not associated during the first association step with movement information to be encoded, identified among the pieces of movement information of the list, according to a second rule which
(Continued)

aims to ensure that each piece of movement information is associated with a single piece of movement information to be encoded.

12 Claims, 6 Drawing Sheets

(51) Int. Cl.
*H04N 19/52* (2014.01)
*H04N 19/61* (2014.01)
*H04N 19/567* (2014.01)

(58) Field of Classification Search
USPC .................................................. 375/240.16
See application file for complete search history.

(56) References Cited

U.S. PATENT DOCUMENTS

| | | | | |
|---|---|---|---|---|
| 8,254,461 B2* | 8/2012 | Haskell | ................. | H04N 19/52 375/240.12 |
| 8,553,768 B2* | 10/2013 | Song | ................. | H04N 19/105 375/240.12 |
| 8,582,904 B2* | 11/2013 | Yu | ................. | H04N 19/105 375/240.12 |
| 8,855,196 B2* | 10/2014 | Li | ................. | H04N 19/52 375/240.01 |
| 8,873,626 B2* | 10/2014 | Karczewicz | ..... | H04N 19/00733 375/240.15 |
| 8,879,621 B2* | 11/2014 | Suzuki | ............ | H04N 19/00587 375/240 |
| 8,934,534 B2* | 1/2015 | Incesu et al. | ............ | 375/240.01 |
| 9,253,492 B2* | 2/2016 | Lee | ..................... | H04N 19/139 |
| 9,253,499 B2* | 2/2016 | Lee | ..................... | H04N 19/52 |
| 2007/0286286 A1* | 12/2007 | Heng et al. | .............. | 375/240.16 |
| 2008/0240247 A1* | 10/2008 | Lee | ..................... | H04N 19/52 375/240.16 |
| 2009/0304084 A1* | 12/2009 | Hallapuro et al. | ........ | 375/240.16 |
| 2010/0027661 A1* | 2/2010 | Doida | ..................... | 375/240.16 |
| 2010/0284465 A1 | 11/2010 | Benzler et al. | | |
| 2013/0039425 A1* | 2/2013 | Jung | ..................... | H04N 19/52 375/240.16 |

OTHER PUBLICATIONS

International Preliminary Report on Patentability and Written Opinion for PCT/FR2011/050898 dated Oct. 23, 2012.
Faouzi Kossentini et al: "Predictive RD Optimized Motion Estimation for Very Low Bit-Rate Video Coding", IEEE Journal on Selected Areas in Communications, IEEE Service Center, Piscataway, US, vol. 15, No. 9, Dec. 1, 1997 (Dec, 1, 1997), XP011054728.
Masashi Takahashi et al: "H.264/AVC improvement based on adaptive motion vector coding", Picture Coding Symposium, 2009. PCS 2009, IEEE, Piscataway, NJ, USA, May 6, 2009 (May 6, 2009), pp. 1-4, XP031491680.
Lee Y Y et al: "Motion Vector Quantization for Video Coding", IEEE Transactions on Image Processing, IEEE Service Center, Piscataway, NJ, US, vol. 4, No. 3, Mar. 1, 1995 (Mar. 1, 1995), pp. 378-382, XP000501911.
J. Le Tanou, J.-M. Thiesse, J. Jung, M. Antonini: "Motion Vector Forecast and Mapping (MV-FMap) Method for Entropy Coding based Video Coders", 2010 IEEE International Workshop on Multimedia Signal Processing (MMSP '10), Saint Malo, France, Oct. 4-6, 2010, Oct. 4, 2010 (Oct. 4, 2010), pp. 206-211, XP002612459.
French Search Report and Written Opinion for French Patent Application No. 1053060, dated Dec. 2, 2010.

* cited by examiner

METHOD FOR PROCESSING A MOTION INFORMATION ITEM, ENCODING AND DECODING METHODS, CORRESPONDING DEVICES, SIGNAL AND COMPUTER PROGRAM

CROSS-REFERENCE TO RELATED APPLICATIONS

This Application is a Section 371 National Stage Application of International Application No. PCT/FR2011/050898, filed Apr. 19, 2011, which is incorporated by reference in its entirety and published as WO 2011/131903 on Oct. 27, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the encoding and decoding of images, and especially of a video stream constituted by a series of successive images.

More specifically, the disclosure pertains to the techniques of encoding by prediction implementing the encoding of motion information on an image, for example the encoding of motion vectors or motion residues.

The disclosure can be applied especially to video encoding implemented in current (MPEG, H.264, etc) or future (ITU-T/VCEG (H.265) or ISO/MPEG (HVC)) video encoders.

BACKGROUND

Here below, referring to FIG. 1, we describe the prior art as regards image prediction in the field of the encoding or decoding of image sequences using the encoding of motion vectors for blocks of an image sub-divided into macroblocks which are then sub-divided into blocks. A block consists of a set of dots or pixels, where the block can have a square, rectangular, triangular or any other geometrical shape.

Thus, according to the H.264 technique for example, the encoder, for a current block to be encoded, computes a motion residual, also called a motion residue, by subtracting a predictor p from the current motion vector mv:

$$\epsilon_{mv} = mv - p,$$

with $\epsilon_{mv}$ being the value of the motion information to be encoded, called a residue, mv being the motion vector coming from motion estimation ("M Estimation" in FIG. 1) selected by the encoder and p being the computed predictor. The predictor corresponds for example to a modified median value of the motion vectors of the neighboring blocks of the current block considered. This residue is sent in an entropic encoder (for example of the "Context-adaptive Huffman variable-length coding" or CAVLC type) or an arithmetic encoder (for example of the "Context-adaptive binary arithmetic coding" or CABAC type).

Although the encoders present in H.264 are context-adaptive, i.e. although the current residue can be encoded differently as a function of the neighboring vectors (the code words are different), they do not make it possible to consider a goal of low-cost encoding of the motion information when computing this information.

To try and overcome this drawback, a prior-art technique described in the U.S. Pat. No. 6,178,265 seeks to compress the motion information to be encoded by encoding only the motion vectors selected as being relevant according to predetermined criteria and therefore reducing the number of motion information items to be encoded.

However, one drawback of this technique lies in the loss of information related to the selecting of the motion vectors to be encoded.

There is therefore a need for a novel technique for optimizing the encoding in terms of encoding tasks without lowering encoding performance.

SUMMARY

An aspect of the disclosure relates to a method for processing at least one motion information item Imv pertaining to a current image of a sequence of images.

According to an embodiment of the invention, such a method comprises:

a step (20) for building at least a list L comprising at least one motion information item, known as an expected motion information item $Imv_i$-a, coming from a prediction by motion compensation on the basis of at least one reference image and having been preliminarily encoded, and at least one motion information item called a non-expected motion information item $Imv_i$-na, not preliminarily encoded;

a first step (21) for associating at least one expected motion information item $Imv_i$-a with a motion information item of said list, called a motion information item to be encoded I'$mv_i$, said first step for associating being implemented according to a first rule of optimization of the cost of encoding said motion information item to be encoded and delivering a modified list L comprising at least one association ($Imv_i$-a, I'$mv_i$);

a second step (22) for associating each piece of non-expected motion information not associated, during said first step for associating, with a motion information item to be encoded I'$mv_i$ identified among said non-expected motion information items not associated during said first step for associating and said expected motion information items associated during said first step for associating, said second step for associating being implemented according to a second rule aimed at ensuring that each of the motion information items $Imv_i$ of said list is associated, during said first or said second type of association, with a single motion information item to be encoded I'$mv_i$, said second step for associating delivering a modified list L comprising as many associations ($Imv_i$-a, I'$mv_i$) as there are motion information items in the list L built during said building step.

Thus, an embodiment of the invention relies on a novel and inventive approach to the improvement of the encoding of an image enabling the association, with a motion information item pertaining to this image, of an information item to be encoded on the basis of potential motion information items.

According to one embodiment of the invention, this association is first of all done as a function of predetermined criteria and to attain a goal of improvement of the encoding, expressed according to a first rule, and a goal aimed at getting all the potential information items associated with a single information item to be encoded.

Thus, in a first stage, the method of an embodiment of the invention builds a list comprising potential motion information items, i.e. information that can potentially be chosen according to predefined classic encoding criteria to encode the image in question.

This list particularly includes already encoded motion information items, i.e. information already selected by an encoder according to predetermined criteria, for example selected during the encoding of images preceding the current image or during the encoding of blocks of the current image preceding the encoding of the current block. These motion information items are here below denoted as "expected" motion information.

This list also contains pieces of "theoretical" motion information, i.e. information potentially usable for encoding the image or the block but has not been previously encoded, therefore not previously selected by an encoder or during the encoding of images preceding the current image or during the encoding of blocks of the current image preceding the encoding of the current block. These motion information items are here below denoted as "non-expected" motion information items.

These potential motion information items have different component values.

The motion information items are information items which classically enable the encoding of an image by prediction by motion compensation on the basis of at least one reference image. Thus, the motion information items are for example motion vectors or motion residues corresponding to a difference between a motion vector and a predictor (the latter corresponding for example to a median motion vector of the motion vectors of the blocks neighboring the current block, which have already been encoded).

In a second stage, once the list has been built, it is modified in two successive steps of association.

In the first step for associating, the list is modified according to a first rule by adding at least one association between one of the motion expected information items that it contains at the outset and a motion information item to be encoded, identified from among the non-expected motion information items in the starting list and the expected motion information items expected the starting list already associated during a previous iteration of this first step for associating. This motion information item to be encoded is identified so as to potentially improve the encoding of the image or of a block of the image. Indeed, if the associated motion information item is selected for this block, during the encoding (according to the predetermined classic encoding criteria), this motion information item to be encoded is the one which will subsequently be encoded for the block.

The expected motion information items are processed in a predetermined order defined by a criterion of processing priority described in detail here below.

During the second step for associating, the list is modified, according to a second rule by adding at least one association between one of the non-expected motion information items that have not been associated during the first step for associating, and a motion information item to be encoded, identified from among the motion information items of the starting list so that all the motion information items of the starting list are associated only once with a single motion information item to be encoded.

According to one embodiment of the invention, the list is built or updated for each block to be encoded of the current image.

In particular, said first step for associating comprises a first step for selecting, according to at least one first criterion of processing priority, at least one of said expected motion information items of said list, called a current motion information item and, for said current motion information item, at least one iteration of the following sub-steps, so long as the said first rule is not verified:

a first sub-step for identifying a motion information item to be encoded, according to at least one second criterion of processing priority, from among said non-expected motion information items and said expected motion information items associated during a previous iteration, and when said first rule is verified, a first sub-step for associating said identified motion information item to be encoded with said current motion information.

According to one embodiment of the invention, a first rule is therefore used to obtain motion information items to be encoded during the first step for associating.

As indicated here above, the first rule defines a goal of improving the encoding aimed at reducing, at the time of the encoding of a block or an image, the cost of encoding a motion information item for this block or this image.

The first rule also defines a first criterion of processing priority used to determine the current motion information item to be considered among the expected motion information items or a second criterion of processing priority to determine the non-expected motion information item to be considered.

Thus, we first consider, one after the other, according to the first chosen criterion of priority, the expected motion information items of the list. Then, for each expected motion information item considered, called a current motion information item, we consider, one after the other, according to the second criterion of priority chosen (which may be identical to that chosen for the current motion information items), the non-expected motion information items of the list and the expected motion information items of the list that have already been associated during a previous iteration. It must be noted that the non-expected motion information items and the already associated, expected motion information items are considered without distinction, i.e. an embodiment of the invention does not consider first the non-expected motion information items and then the already associated expected motion information items but all these information items one after the other so long as the goal of improving the encoding cost has not been attained.

For example, the non-expected motion information item is chosen if the cost of encoding can be considered, a priori, to be lower than the cost of encoding the current motion information item.

When the first rule is not verified, i.e. when the identified motion information item (non-expected or expected having already been associated during a preceding iteration) does not bring a priori improvement in the encoding cost, then another motion information item (non-expected or expected having already been associated during a preceding iteration) is identified according to the second criterion of priority chosen to carry out a new test to see if the first rule is verified.

If, finally, no non-expected motion information item can be associated with a current motion information item, then the latter is associated with itself, i.e. its associated motion information item to be encoded is itself.

Thus, according to this embodiment of the invention, when said first rule is not verified, said current motion information item is associated with itself.

According to one alternative embodiment of the invention, these encoding costs are computed in order to verify the hypothesis of optimization of the encoding cost.

According to one particular characteristic of an embodiment of the invention, said second step for associating comprises at least one iteration of the following steps:
- a second step for selecting, according to at least one third criterion of processing priority, at least one of said non-expected motion information items not associated during said first step for associating, called a current motion information item, and
- for said current motion information item:
  - a second sub-step for identifying a motion information item to be encoded, according to at least one fourth criterion of processing priority, from among said non-expected motion information items not associated during said first step for associating and said expected motion information items associated during said first step for associating, and
  - a second sub-step for associating said identified motion information item to be encoded, with said current motion information item.

We shall now therefore consider the non-expected motion information items not associated during the first step for associating.

The goal of the second rule is that all the motion information items of the starting list should be associated with a motion information item to be encoded while at the same time trying to attain a goal of optimizing the encoding cost, for example to obtain an encoding cost that the least "unfavorable cost" possible for encoding the motion information to be encoded, relatively to its associated motion information item.

The second step for associating also takes account of criteria (third and fourth criteria) of priority of processing motion information items of the list, as already described here above with reference to the first and second criteria.

Just as in the case of the first step, it is possible that a current motion information item (not expected) will not be capable of being associated with a motion information item to be encoded that is distinct from itself. In this case, the current motion information item is associated with itself, i.e. its associated motion information item to be encoded is itself.

For example, said criteria of processing priority correspond to at least one parameter belonging to the group comprising the following parameters:
- a sense of processing of the motion information items of said list, when they are represented in a referential system for which each axis corresponds to a distinct component of a motion information item;
- an information item representing the number of times that an expected motion information item has been preliminarily encoded, called a frequency of appearance;
- an information item representing a degree of confidence associated with a piece of information on motion; or
- a combination of the preceding parameters.

Thus, the processing priority can depend on different parameters which may or may not be combined.

According to one particular embodiment of the invention, the processing priority corresponds to a sense of processing of the motion information items when they are represented "graphically" in a referential system. For example, a referential system of this kind represents a motion information item in two dimensions (x,y), each corresponding to a component of the motion information item when it represents motion in two dimensions. According to one variant, a referential of this kind represents a motion information item in three dimensions (x,y,z), each corresponding to one component of the motion information item when it represents motion in three dimensions. Thus, a motion information item can be represented by a dot, or a position, for which the coordinates in this referential correspond to the values of the components of the motion information item. The centre of the referential can for example represent zero motion.

According to another embodiment, the processing priority takes into consideration a frequency of appearance of the motion information item in the previous encodings performed (encoding of the images preceding the current image and/or encoding of the blocks preceding the current block). Thus, in the list of motion information items, an expected motion information item can be associated with a frequency of appearance indicating the number of times that it has been preliminarily encoded, i.e. selected by the encoder, or an order of magnitude of the number of times that it has been preliminarily encoded. It is possible for example to consider that the motion information items showing the greatest frequency of appearance will be treated by priority.

According to yet another embodiment, the processing priority takes into consideration a degree of confidence associated with a motion information item, i.e. the processing priority takes account of a greater or smaller value of probability that a motion information item of the list will be effectively selected for the encoding of the block, according to predefined, classic encoding criteria. Thus, the motion information items having the highest degree of confidence are processed by priority. This technique of associating a degree of confidence with a motion information item is especially described in greater detail in the patent application entitled "Method for enriching a motion information item, corresponding encoding method, devices and computer program", WO 2011/131902 A2, filed on the same day as the present application on behalf of the same applicant.

In other embodiments, these parameters can be combined to define a priority of processing.

In particular, said sense of processing belongs to the group comprising:
- a spiral sense of processing,
- a diamond-shaped sense of processing,
- a sense of processing that takes account of at least one position, in said referential system, of said motion information items,
- and in that said sense of processing is centered on a predetermined motion information item or on a barycenter of said motion information items of said list.

For example, according to a first embodiment, a sense of processing of the information items, when they are represented in a referential, consists in scanning the dots or positions representing the motion information items according to a predefined geometrical template such as a spiral or a diamond. In practice, a spiral is scanned for example in moving away from its centre, this centre possibly being represented by a predetermined motion information item or a barycenter of the motion information items shown.

In a second embodiment, a sense of processing of the information items can take account of the respective positions of the motion information items shown. For example, an embodiment of the invention processes, by priority, the motion information items for which the positions are at the greatest distance from the centre of the referential, i.e. the motion information items representing a big motion.

According to one embodiment of the invention, said building step takes account of a number n of reference images.

Thus, it is possible to choose to consider a greater or a smaller number of reference images and hence a larger or a smaller sample of motion information items already encoded. Thus, the temporal activity of the scene can be taken into account. For example, if the successive images are very different from one another, then there is a risk that the motion information items already encoded might not be relevant for the current image. In this case, it is preferable not to consider a large number of previous images.

An embodiment of the invention also relates to a method for encoding at least one current block of a current image of a sequence of images.

According to the invention, such a method for encoding implements a method of processing such as the one already described and the following steps:

selecting a motion information item for said current block from among said motion information items of said list;

encoding a motion information item to be encoded associated, during said first or said second step for associating, with said motion information item selected during said step for selecting, delivering a motion information item encoded for said block.

Thus, an embodiment of the invention, according to this embodiment, enables the encoding of a motion information item in an optimized way. Indeed, the encoded motion information is not directly the selected motion information according to predetermined classic criteria for encoding but a motion information item modified according to an embodiment of the invention, associated with the chosen motion information.

Thus, according to this embodiment of the invention, the encoding of a current image is optimized because it has an encoding cost which is reduced on the whole for all the blocks of the image as compared with the prior art.

In particular, the reduction of the cost of encoding corresponds to a reduction of the cost of transport, between an encoder and a decoder, of the motion information items associated with the blocks of an image. Thus, the transmission bit rate can be increased as compared with the prior art.

Another aspect of the invention relates to a signal representing at least one encoded block of an image of a sequence of images. According to this aspect of the invention, a signal such as this carries at least one motion information item encoded according to the method for encoding described here above.

Furthermore, such a signal carries an information item representing a number n of reference images.

An embodiment of the invention also pertains to a method for decoding at least one current block of a current image of a sequence of images.

According to an embodiment of the invention, such a decoding method comprises the following steps:

receiving and decoding a motion information item encoded according to the method for encoding described here above delivering a decoded motion information item;

implementing steps of the method for processing described here above;

selection, from among said motion information items of said list, a motion information item associated, during said first or said second step for associating, with said decoded motion information item;

rebuilding said block from said selected motion information item.

Another aspect of the invention relates to a device for processing at least one motion information item pertaining to a current image of a sequence of images. According to this aspect of the invention, such a processing device comprises:

means for building at least one list L comprising at least one motion information item, called an expected motion information item $Imv_i$-a, coming from a prediction by motion compensation on the basis of at least one reference image and having been preliminarily encoded, and at least one motion information item called an non-expected motion information item $Imv_i$-na, not preliminarily encoded;

first means for associating at least one expected motion information item $Imv_i$-a with a motion information item of said list, called a motion information item to be encoded $Imv_i$, said first means for associating being adapted to complying with a first rule of optimizing the cost of encoding said motion information item to be encoded and delivering a modified list L comprising at least one association ($Imv_i$-a, $I'mv_i$);

second means for associating each non-expected motion information item, not associated by said first means for associating, with a motion information item to be encoded $I'mv_i$ identified from among said non-expected motion information items not associated by said first means for associating and said expected motion information items associated by said first means for associating, said second means for associating being adapted to complying with a second rule aimed at ensuring that each of the motion information items $Imv_i$ of said list is associated, by said first or second means for associating, with a single motion information item to be encoded $I'mv_i$, the second means for associating delivering a modified list L comprising as many associations ($Imv_i$-a, $I'mv_i$) as the motion information items in the list L built by the building means.

Such a processing device is especially suited to implementing the steps of the method for processing described here above. This device could of course include the different characteristics of the method for processing according to an embodiment of the invention. Thus, the characteristics and advantages of this processing device are the same as those of the method for processing and shall not be described in more ample detail.

Another aspect of the invention pertains to a device for encoding also called an encoder of at least one current block of a current image of an image sequence. According to this aspect of the invention, a device for encoding such as this comprises means of the processing device described here above, and:

means for selecting a motion information item for said current block from among said motion information items of said list;

means for encoding a motion information item to be encoded associated, by said means of said processing device, with said selected motion information item selected by said means for selecting.

An embodiment of the invention also pertains to a device for decoding at least one current block of a current image of a sequence of images comprising:

means for receiving and decoding a motion information item encoded by the means of the device for encoding described here above delivering a decoded motion information item;

means for implementing the means of the processing device described here above;

means for selecting, from among said motion information items of said list, a motion information item associated with said decoded motion information item by said first or second means for associating;

means for rebuilding said block from said selected motion information item.

Finally, an embodiment of the invention pertains to a computer program comprising instructions for implementing a method for processing, encoding or decoding as described here above when this program is executed by a processor.

BRIEF DESCRIPTION OF THE DRAWINGS

Other characteristics and advantages shall appear more clearly from the following description of a particular embodiment given by way of a simple, illustratory and non-exhaustive example and from the appended figures, of which.

DETAILED DESCRIPTION OF ILLUSTRATIVE EMBODIMENTS

1. General Principle

The general principle of an embodiment of the invention relies on the processing of a motion information item Imv pertaining to an image of an image sequence so as to deliver a modified motion information item I'mv, to the encoder for the encoding of an image or a block of the image. This modified motion information item I'mv, is here below called a motion information item to be encoded. The encoding cost of this modified information item is, a priori, optimized as compared with the motion information item before processing.

Thus, an embodiment of the invention makes it possible to obtain an overall improvement of the cost of encoding a video image sequence, in directly encoding not the motion information Imv pertaining to each image but a motion information item I'mv processed according to an embodiment of the invention.

To this end, an embodiment of the invention is based on a set of motion information items potentially useable for the encoding of the block or of the image. The building of this set according to an embodiment of the invention then enables the processing of each of the motion information items that it contains so that the motion information that will be effectively selected for the encoding of the block or the image is also processed.

A motion information item Imv is considered to be an information item classically enabling the encoding of an image by prediction by motion compensation on the basis of at least one reference image.

Thus, a motion information item is for example a motion vector or a motion residue corresponding to a difference between a motion vector and a predictor (the latter corresponding for example to a median motion vector of the motion vectors of the blocks neighboring the already encoded current block) or again a predictor.

Besides, at the time of the decoding of a block or an image, the processing of the motion information according to the principle of an embodiment of the invention is also implemented in order to efficiently decode the motion information item pertaining to the block or to the image being rebuilt.

2. Description of an Embodiment

Referring now to FIGS. 2 to 6, we present the main steps of the method for processing according to one embodiment of the invention.

In this embodiment, a motion information item Imv is considered to correspond to a motion residue any, computed for example according to the technique described with reference to the prior art for a block of a current image or a sequence of images.

Figure 1:
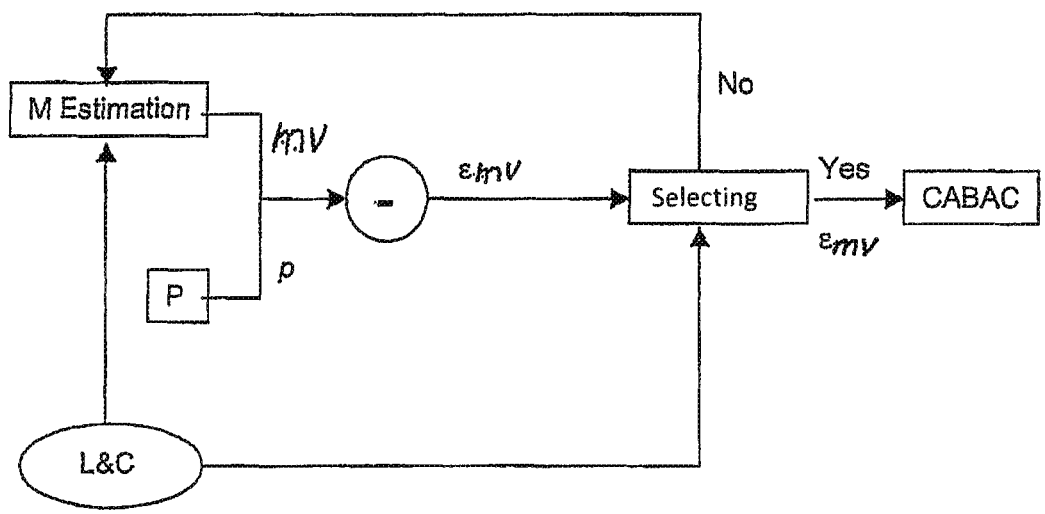
FIG. 1 already commented upon with reference to the prior art illustrates an example of an encoding system according to the H.264 technique of the prior art.
Figure 2:
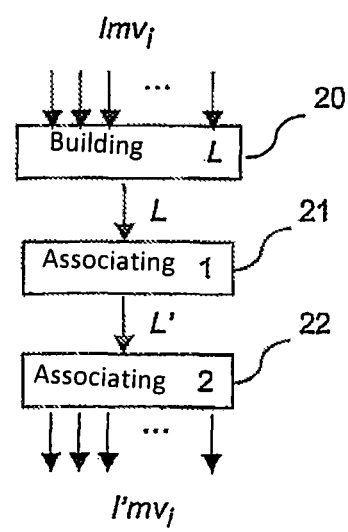
FIG. 2 illustrates the main steps of the method for processing a motion information item pertaining to an image according to one embodiment of the invention.

As illustrated in FIG. 2, the method for processing according to this embodiment of the invention comprises chiefly three steps 20, 21 and 22.

At a first step 20 for building a list L, all the motion information items previously selected and encoded during the encoding of one or more images preceding the current image and/or during the encoding of the blocks preceding the current block are listed. These motion information items are here below called expected motion information items and are denoted as $Imv_i$-a.

The step 20 also integrates, into the list L, all the motion information items potentially selectable by the encoder that are different from the motion information items $Imv_i$-a, called theoretical motion information items or non-expected information items and denoted as $Imv_i$-na.

Figure 4A:
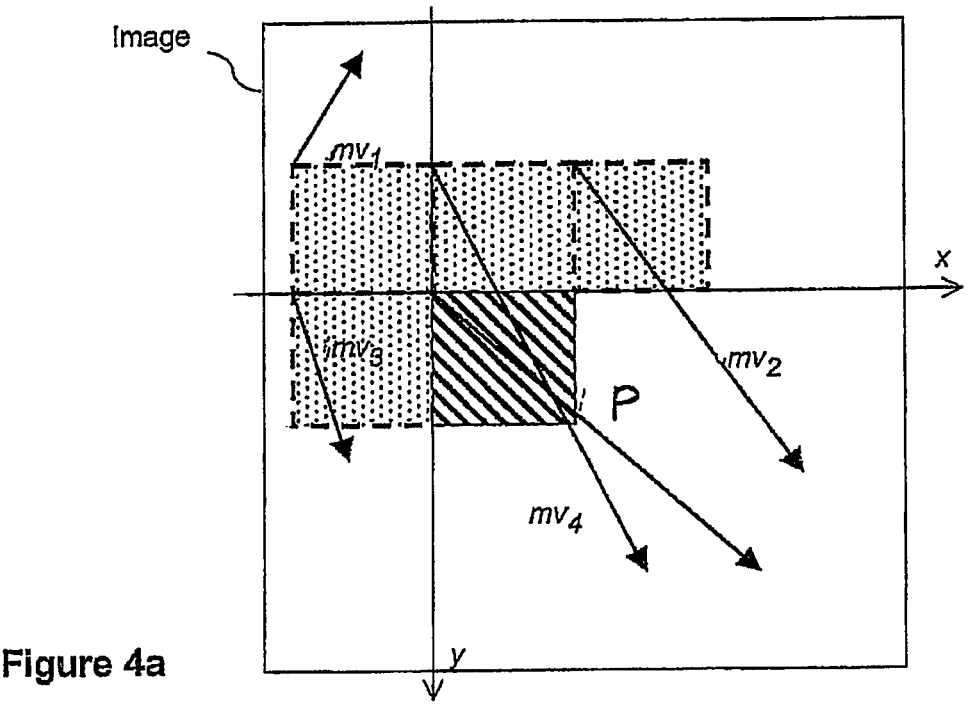
FIGS. 4a, 4b, 5a, 5b and 6 illustrate examples of representation of motion information items for a current block of an image.
Figure 4B:
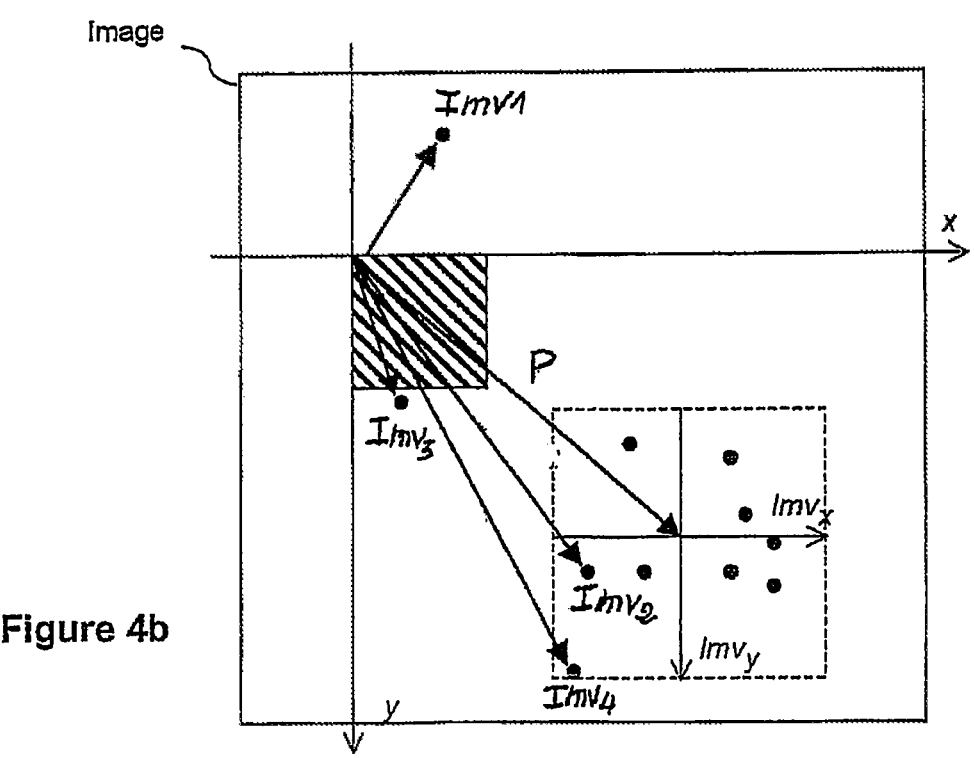

An illustration in graphic form of an example of this list L, as presented in FIGS. 4a and 4b, provides for a better understanding of these notions.

FIG. 4a first of all presents an image "Image" in which a current block is being processed according to the method of an embodiment of the invention. This block is represented by a hashed square. Previously encoded neighboring blocks are represented by blank squares with black spots.

Besides, motion information items $mv_1$ to $mv_4$ are represented in the form of vectors by arrows along the axes x and y each corresponding to a component of the motion information item. These motion information items correspond to the preliminarily encoded motion vectors of the blocks neighboring the current block. For example, the motion information item $mv_2$ corresponds approximately to a movement of two blocks rightwards and two blocks downwards while the motion information $mv_1$ corresponds approximately to the movement of one block rightwards and one block upwards.

In addition to these current motion information items, the motion information item P corresponds to a predictor computed for the current block.

FIG. 4b shows a specific referential centered on the predictor P, in the form of a window shown in dashes. This referential is used to represent the motion information items Imv, relatively to the predictor P of the current block. These motion information items Imv are represented by dots, also called positions, and are shown as a function of their components. This referential system corresponds to the referential system of the potential motion residuals for the encoding of the motion residual of the current block. Each of the motion information items $Imv_1$ to $Imv_4$ corresponds to the difference between, on the one hand, respectively each motion vector $mv_1$ to $mv_4$ and, on the other hand, the motion information item P (the predictor motion vector).

It can thus be seen, in FIG. 4b, that certain dots correspond effectively to motion information items ($Imv_2$ and $Imv_4$), belonging to blocks encoded before the current block. Other dots for their part correspond to motion information items pertaining to images encoded before the current image. All these represented dots correspond to the motion information items $Imv_i$-a of the list L for the current block considered.

The size of the window in dashes is predetermined and defines the size of the list L.

It must be noted that this number n of images preceding the current image taken into account for the building of the list can vary as a function of certain criteria related for example to the temporal activity of the sequence of images. Furthermore, this number n must be known to the decoder and may therefore for example be transmitted to it in a signal.

Besides, the motion information items coming from the reference images, and therefore temporally distant from the current image, are resealed in a classic way so as to manage the temporal distance.

Finally, since this list can include motion information items of the blocks encoded previously to the current block, it can be updated for each block.

From this list, one goal is that of associating, with each of the information items $Imv_i$ comprising the motion information items $Imv_i$-a and $Imv_i$-na, a single motion information item $I'mv_i$, having an a priori optimized encoding cost.

Thus when, at the time of decoding, a motion information item $Imv_i$ is selected for the current block according to known encoding criteria, it is the motion information to be encoded $I'mv_i$, associated according to this embodiment of the invention, that is encoded by the encoder, thus making it possible to optimize the cost of encoding the block.

To this end, a first step for associating 21 consists in associating, when possible, a motion information item $I'mv_i$ with all the expected motion information items $Imv_i$-a of the list L this motion information item $I'mv_i$, being chosen from among the non-expected motion information items $Imv_i$-na of the list L and the expected motion information items associated during a previous iteration of the first step 21 so that the cost of encoding $I'mv_i$ is a priori smaller than that of $Imv_i$-a. This optimizing of the cost of encoding is defined according to a first rule.

This first step for associating, described here below in greater detail with reference to FIGS. 3a and 5a may consist for example in creating a second column in the list L or else in creating links between the different elements of the list L, thus modifying it into a list L'.

Once this first step for associating 21 has been performed, a second step for associating 22 is implemented from the modified list L'.

At this step, each element of the starting list L that has not been associated during the step 21 is processed so that, at the end of the second step for associating 22, each of the motion information items $Imv_i$ of the starting list L is associated with a motion information item to be encoded $I'mv_i$.

For example, the motion information items processed during this second step are non-expected motion information items $Imv_i$-na that have not "served" for an association during the first step 21.

A more detailed description shall now be provided of these two successive steps 21 and 22 of association with reference to FIGS. 3a, 3b and 5a and 5b.

Figure 5A:
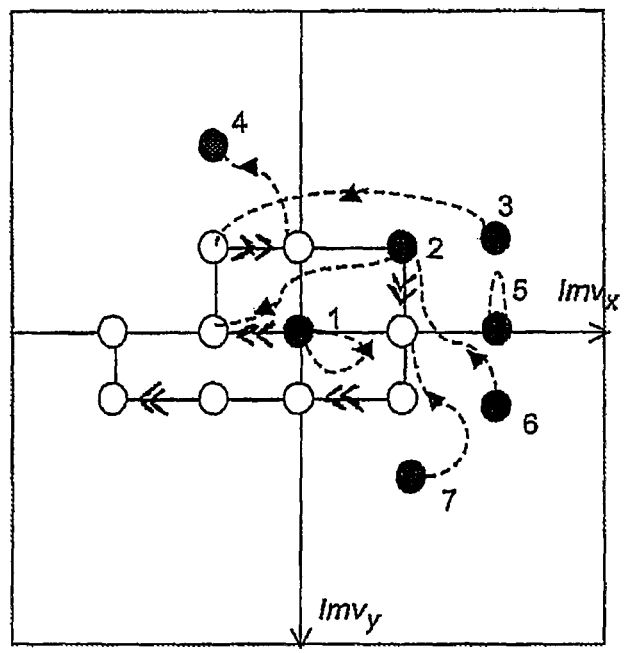

FIG. 5a is a graphic representation of the motion information items of the list L in the form of dots, which are black for the expected motion information items $Imv_i$-a or blank for non-expected motion information items $Imv_i$-na.

Figure 3A:
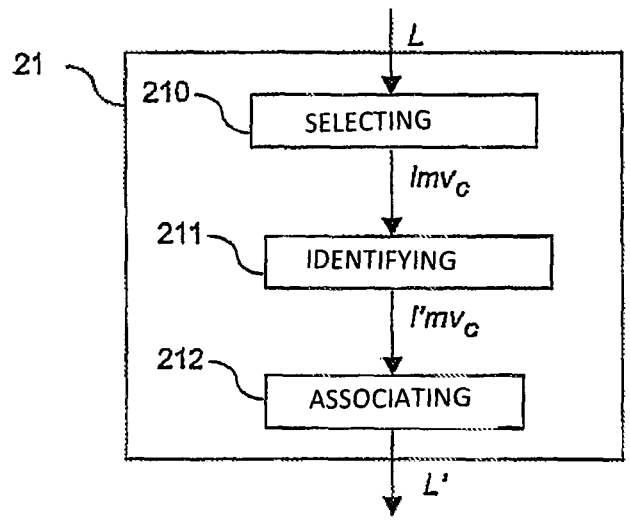
FIGS. 3a and 3b respectively illustrate the first and second steps for associating the method for processing of FIG. 2.
Figure 3B:
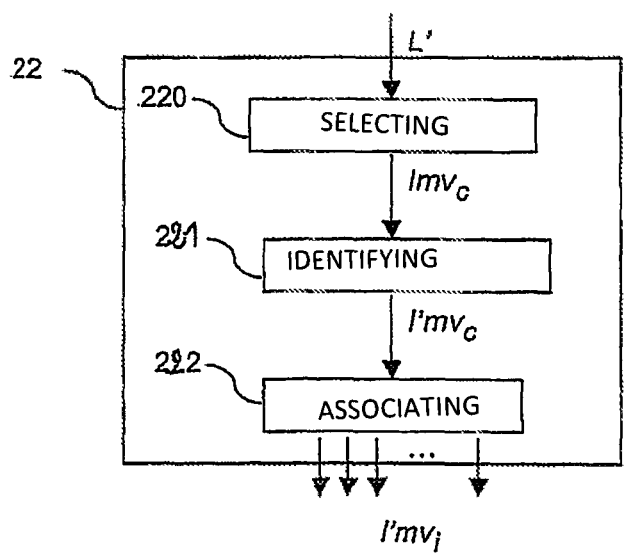

FIG. 3a illustrates the main sub-steps of the step for associating 21, namely a sub-step for selecting 210, a sub-step for identifying 211 and a sub-step for associating proper 212.

The first sub-step for selecting 210 consists first of all of the selection, according to a criterion of processing priority, of a motion information item $Imv_i$-a of the list L to be processed first. Since the goal of this first step for associating 21 is to optimize the encoding cost, it is preferable to carry out a priority processing of the motion information items $Imv_i$-a considered as having a higher potential for being selected at the time of the encoding. Thus, the motion information that will effectively be chosen when encoding is well associated with a motion information item to be encoded, the encoding cost of which is optimized.

Graphically, this first selecting consists in choosing a black dot from among those shown in FIG. 5a.

The criterion of processing priority can for example be based on the frequency of appearance related to each motion information item of the list, and corresponding to an information item representing the number of times when a motion information item has been preliminarily encoded. For example, the frequency of appearance is equal to the exact number of times when the motion information item has already been encoded, during the encoding of the n previous images and the blocks preceding the current block. The frequency of appearance can also be equal to an order of magnitude of this number of times that it has already been encoded, such as "greater than 20" or "smaller than 5". This criterion of processing priority thus enables the priority processing of the most frequent expected motion information items $Imv_i$-a and therefore the association with them of the motion information items to be encoded $I'mv_i$ which are optimal in terms of encoding. When a motion information item has never been preliminarily encoded (which is the case for example with non-expected information items $Imv_i$-na described here above) their frequency of appearance is zero.

The criterion of priority can also be based on a sense of geometrical scanning when the motion information items are represented graphically, as in FIG. 5a. For example, a processing sense of this kind consists in taking the expected motion information items in the order in which they appear when starting from the centre of the referential towards the exterior of the referential in scanning along a spiral (such as for example the spiral linking the blank dots in FIG. 5a which is scanned in the sense indicated by the double-headed arrows). The scanning sense can also be represented in the form of a diamond centered on the centre of the referential system. The examples of geometrical scanning sense described here above can also be centered on another point of the referential system distinct from the centre, for example a point representing the barycenter of all the information items of the list L.

The scanning sense can also take account of a distance computed between the point to be processed and another point considered as a reference.

The criterion of processing priority can also be based on a piece of information representing a degree of confidence associated with the motion information items of the list L. Thus, since the motion information items of the list L have a high degree of confidence, they can be processed by priority, enabling the association with them of the motion information items to be encoded I'mv$_i$ which are optimal in terms of encoding cost.

These different types of priority criterion can be combined. They must also be known to the decoder so that it can also implement these steps of association.

According to FIG. 5a, the criterion of processing priority used, for example as a function of the frequency of appearance, amounts to numbering the black dots, for example 1 to 7, and processing them in rising order of number.

Once an expected motion information item has been selected at the sub-step 210 and considered to be a current motion information item Imv$_c$, a sub-step 211 for identifying a non-expected motion information item is implemented.

This identification is based on the first rule already described here above, consisting in optimizing the cost of encoding a motion information item. Thus, a search is made for a non-expected motion information item or a motion information item that is expected but is already associated with a non-expected motion information item during a previous iteration (for example the dot 6 is associated with the dot 2 which itself already has been associated with a blank dot during a previous iteration), which would potentially cost less to encode than the current motion information item selected, from among all the non-expected motion information items Imv$_i$-na of the list L. This identification is also based on a criterion of processing priority as described here above.

Considering the depiction of FIG. 5a, it is therefore sought to associate, for each black dot 1 to 7, a blank dot which verifies the above-mentioned rule, for example in considering the blank dots along the spiral illustrated in FIG. 5a.

As soon as a motion information item (non-expected or expected and already associated during a previous iteration) enables a check on said first rule, then it is considered to be a motion information item to be encoded I'mv$_i$ and associated, in a sub-step for associating 212, with the current motion information item Imv$_c$. This association is represented in FIG. 5a by a line of dashes linking:

the black dot 2 and the first blank dot of the spiral,
the black dot 3 and the second blank dot of the spiral,
the black dot 4 and the third blank dot of the spiral.

It is possible during the first step for associating 21, that certain expected motion information items cannot be associated with motion information to be encoded, identified among the non-expected motion information items. For example, when they are represented in FIG. 5a, these are motion information items for which the positions are situated on one of the axes of the referential system. Thus, it can be chosen not to associate them with a motion information item to be encoded for which the position is not situated on this axis. This is the case for example with a motion information item represented by the black dots 1 and 5. The first rule is then expressed as follows: a black dot is not shifted towards a blank dot if the components of this blank dot are respectively smaller than or equal to the components of the black dot in terms of absolute value. This means that, for this type of expected motion information item, the associated motion information item to be encoded I'mv$_i$ is the expected motion information item itself.

This first step for associating 21 is implemented for all the expected motion information items of the list and gives rise to an equivalent number of associations. It can therefore be considered that the list L has been modified following this first step 21 into a list L'.

Figure 5B:
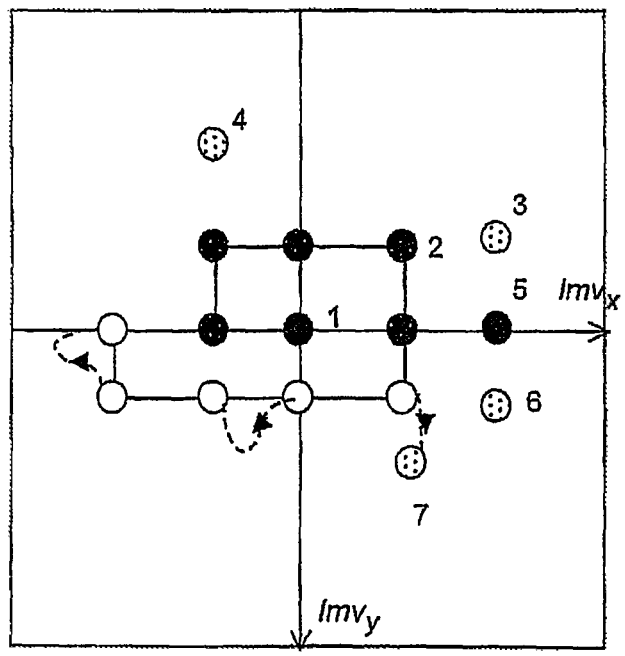

A representation of this modified list L is presented in FIG. 5b. The previous black dots that had been associated with blank dots have become blank dots with black spots and the associated blank dots have become black dots with white spots. Thus, in terms of graphic representation, the positions corresponding to the black dots of FIG. 5a are "released" in FIG. 5b. However, the positions corresponding to the black dots of FIG. 5a are now "occupied" in FIG. 5b.

The step 22 also has three sub-steps 220, 221 and 222 which are identical in principle to the sub-steps 210, 211 and 212 described here above with reference to the first step for associating 21. Indeed, the sub-steps 220, 221 and 222 differ from the sub-steps 210, 211 and 212 only in the motion information items that they process. This difference is essentially linked to the fact that the goal of this second step for associating 22 is to get each motion information item of the list L to be associated with a single motion information item to be encoded I'mv.

The three sub-steps for selecting 220, identifying 221 and associating 222 are also based on criteria of processing priority as described here above.

We shall not describe again in detail the three sub-steps 220, 221 and 222. We must however note the following specific features:

the sub-step for selecting 220 takes into consideration all the non-expected motion information items not associated during the first step for associating 21, i.e. the motion information items represented graphically in FIG. 5a by blank dots;

the sub-step for identifying 221 takes into consideration the motion information items represented graphically in FIG. 5a by blank dots and blank dots with black spots so that the motion information item to be encoded I'mv identified has, a priori, an optimal encoding cost or the least unfavorable encoding cost;

the sub-step for associating 222 enables the association, with each motion information item selected during the sub-step 220, of a single motion information item to be encoded I'mv identified during the sub-step 221. These associations are shown in FIG. 5b by dashed lines.

It must be noted that in this second step for associating 22, a motion information item to be encoded I'mv can have an encoding cost that is, a priori, higher, but the least unfavorable possible, than the selected motion information with which this motion information item to be encoded I'mv is associated. However, since this second step for associating does not process all the most frequent expected motion information items (as indicated here above with reference to the criterion of processing priority), this does not on the whole affect the cost of encoding the image.

Thus, at the exit from this second step for associating 22, and as illustrated in FIG. 5b, all the motion information items Imv of the list L have been associated with a motion information item to be encoded I'mv.

3. Description of One Variant of the Embodiment

Figure 6:
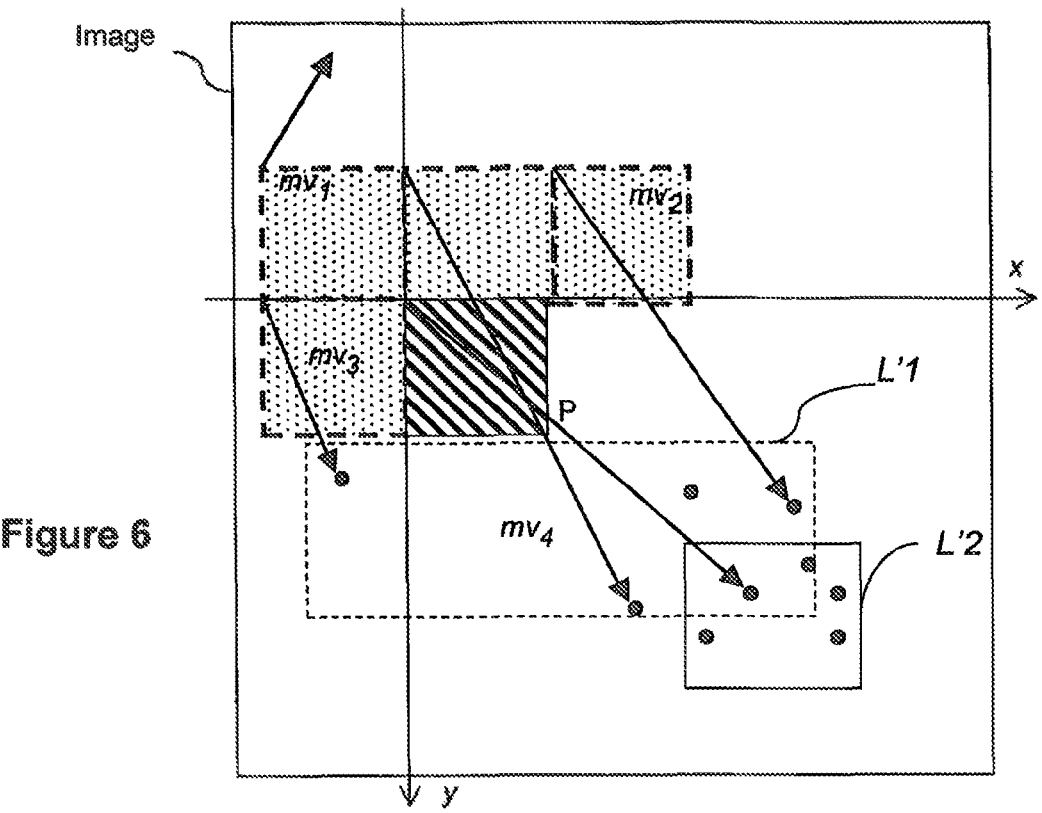

FIG. 6 illustrates a variant of the embodiment described here above where we consider only one part of the built list L called a sub-list L' with a view to achieving a compromise between encoding quality and complexity of implementation.

Thus, a first type of restriction applied to the list L can be based on the type of expected motion information items that it contains. Indeed, it is possible for example to give preference to the expected motion information items coming from the previous encoding of neighboring blocks, in the image of the current block. The sub-list L'1 then corresponds to the "sub-window" L'1 illustrated in dashes in FIG. 6.

The second type of restriction applied to the list L can be based on a degree of confidence associated with the expected motion information items that it contains. Indeed, it is possible for example to give preference to the expected motion information items having the highest probability of being effectively selected during encoding. The sub-list L'2 then corresponds to the "sub-window" L'2 illustrated in FIG. 6 in a solid line.

4. Description of an Embodiment of Encoding and Decoding a Block of an Image

In this embodiment of the invention the processing steps described here above are implemented by a method for encoding a block of an image.

Thus, the method of encoding according to this embodiment of the invention selects, from among the motion information items of the list L, a motion information item corresponding to classic predefined criteria of encoding such as for example the bit rate/distortion criterion. In this case, the bit rate parameter of the bit rate/distortion criterion is then computed from the associated motion information item to be encoded I'mv.

Indeed, the motion information item effectively encoded for the block and transmitted to be then decoded by a decoder at the time of the rebuilding of the block of the image is the motion information item to be encoded I'mv associated with it during the steps of the method for processing described here above and having, a priori, a lower encoding cost.

Thus, the cost of encoding the block of the image is optimized while ensuring optimal encoding performance.

At decoding, the motion information items I'mv transmitted by the encoder are considered to be motion information items to be decoded.

At the time of decoding a block, the decoder implements the same steps as those implemented by the encoder, i.e. it implements the steps of the method for processing so as to obtain a list and a plurality or associations between the motion information items Imv and the motion information items to be decoded I'mv.

Then, the decoder decodes the information received, transmitted by the decoder, and then it identifies in its list, among the motion information items to be decoded I'mv, the motion information item that corresponds to the motion information item that it has just decoded. To know the motion information item corresponding to the block which it is building, it searches for the associated motion information item Imv.

5. Structure of a Processing Device

Figure 7:
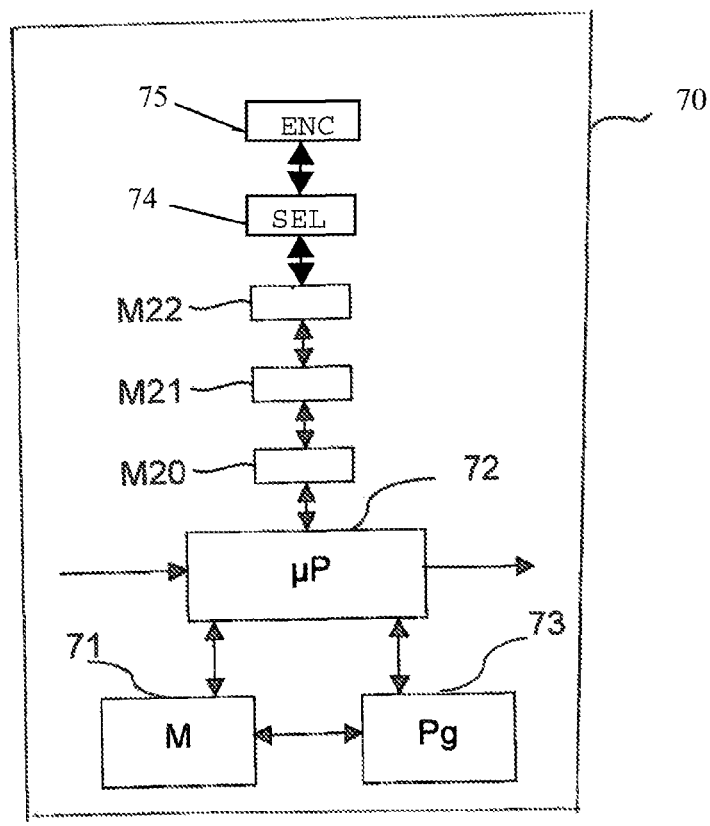
FIG. 7 illustrates an example of a simplified structure of a processing device according to one embodiment of the invention.

FIG. 7 illustrates a simplified structure of a device 70 for processing according to one embodiment of the invention.

For example, the device 70 for processing comprises a memory 71 constituted by a buffer memory, a processing unit 72 equipped for example with a microprocessor μP and driven by the computer program 73, implementing the encoding method according to an embodiment of the invention.

At initialization, the code instructions of the computer program 73 are for example loaded into a RAM and then executed by the processor of the processing unit 72. The processing unit 72 inputs at least one motion information element pertaining to an image of a sequence of images. The microprocessor of the processing unit 72 implements the steps of the method for processing described here above according to the instructions of the computer program 73 to deliver at least one motion information item to be encoded. To this end, the encoder device 70 comprises, in addition to the buffer memory 71:

a module (M20) for building at least one list L comprising at least one motion information item, called an expected motion information item $Imv_i$-a, coming from a prediction by motion compensation on the basis of at least one reference image and having been preliminarily encoded, and at least one motion information item called an non-expected motion information item $Imv_i$-na, not preliminarily encoded;

a first module (M21) for associating at least one expected motion information item $Imv_i$-a with a motion information item of said list, called a motion information item to be encoded $I'mv_i$, the first module for associating M21 being adapted to complying with a first rule of optimizing the cost of encoding the motion information item to be encoded and delivering a modified list L comprising at least one association ($Imv_i$-a, $I'mv_i$);

a second module (M22) for associating each non-expected motion information item, not associated by the first module for associating, with a motion information item to be encoded $I'mv_i$ identified from among the non-expected motion information items not associated by the first module for associating and the expected motion information items associated by the first module for associating, the second module for associating being adapted to complying with a second rule aimed at ensuring that each of the motion information items $Imv_i$ of the list is associated, by the first or second modules for associating, with a single motion information item to be encoded $I'mv_i$, the second module for associating delivering a modified list L comprising as many associations ($Imv_i$-a, $I'mv_i$) as the motion information items in the list L built by the building module.

These modules are driven by the microprocessor of the processing unit 72.

The encoding device 70 further is configured to encode at least one current block of said current image of said image sequence, wherein the encoding device:

selects 74 a motion information item for said current block from among said motion information items of said list; and encodes 75 a motion information item to be encoded associated, by said means of said processing device 72, with said selected motion information item selected by said means for selecting.

Figure 8:
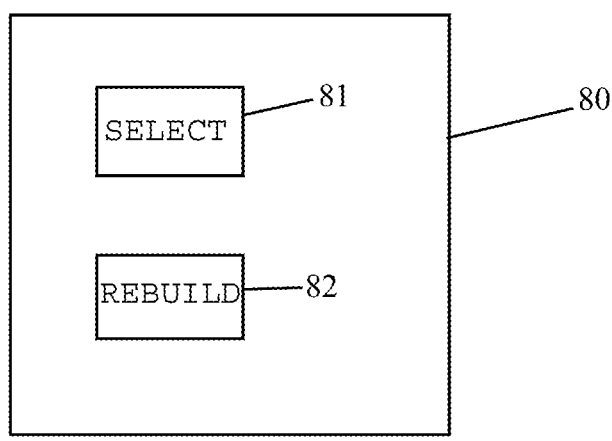
FIG. 8 illustrates an example of a simplified structure of a decoding device according to one embodiment of the invention.

FIG. 8 illustrates a device 80 for decoding at least one current block of a current image of a sequence of images, wherein the decoding device:

selects 81, from among said motion information items of said list, a motion information item associated with said decoded motion information item by said first or second means for associating;

rebuilds 82 said block from said selected motion information item.

Although the present disclosure has been described with reference to one or more examples, workers skilled in the art will recognize that changes may be made in form and detail without departing from the scope of the disclosure and/or the appended claims.

The invention claimed is:

1. A method comprising:
processing at least one motion information item pertaining to a current image of a sequence of images, wherein said method comprises:
a step of building, with a processing device, at least a list comprising motion information items, including at least one motion previously-selected motion information item, coming from a prediction by motion compensation on the basis of at least one reference image and having been preliminarily encoded, and at least one non-previously-selected motion information item, not preliminarily encoded;
a first step of associating, with the processing device, at least one previously-selected motion information item of said list with a motion information item of said list, called a motion information item to be encoded, said first step of associating being implemented according to a first rule of optimization of the cost of encoding said motion information item to be encoded and delivering a modified list comprising at least one association; and
a second step of associating, with the processing device, each non-previously-selected motion information item of said list not associated during said first step of associating, with a motion information item to be encoded identified among said non-previously-selected motion information items not associated during said first step of associating and said previously-selected motion information items associated during said first step of associating, said second step of associating being implemented according to a second rule aimed at ensuring that each of the motion information items of said list is associated, during said first or said second steps of association, with a single motion information item to be encoded, said second step of associating delivering a modified list comprising as many associations as there are motion information items in the list built during said building step;
encoding at least one current block of said current image of said sequence of images, comprising:
selecting a motion information item for said current block from among said motion information items of said modified list; and
encoding a motion information item to be encoded associated, during said first or said second step of associating, with said motion information item selected during said step of selecting, delivering a motion information item encoded for said block; and
generating a signal representing said at least one encoded block of said current image of said sequence of images, wherein said signal carries said encoded at least one motion information item.

2. The method according to claim 1, wherein said first step of associating comprises a first step of selecting, according to at least one first criterion of processing priority, at least one of said previously-selected motion information items of said list, called a current motion information item and,
for said current motion information item, at least one iteration of the following sub-step, so long as the said first rule is not verified:
a first sub-step of identifying a motion information item to be encoded, according to at least one second criterion of processing priority, from among said non-previously-selected motion information items and said previously-selected motion information items associated during a previous iteration, and
when said first rule is verified, a first sub-step of associating said identified motion information item to be encoded with said current motion information.

3. The method according to claim 1, wherein said second step of associating comprises at least one iteration of the following steps:
a second step of selecting, according to at least one third criterion of processing priority, at least one of said non-previously-selected motion information items not associated during said first step of associating, called a current motion information item, and for said current motion information item:
a second sub-step of identifying a motion information item to be encoded, according to at least one fourth criterion of processing priority, from among said non-previously-selected motion information items not associated during said first step of associating and said previously-selected motion information items associated during said first step of associating, and
a second sub-step of associating said identified motion information item to be encoded, with said current motion information item.

4. The method according to claim 3, wherein at least one of the third or fourth criterion of processing priority corresponds to at least one parameter belonging to the group consisting of the following parameters:
a sense of processing of the motion information items of said list, when they are represented in a referential system for which each axis corresponds to a distinct component of a motion information item;
an information item representing the number of times that a previously-selected motion information item has been preliminarily encoded, called a frequency of appearance;
an information item representing a degree of confidence associated with a piece of information on motion;
a combination of the preceding parameters.

5. The method according to claim 2, wherein at least one of the first or second criterion of processing priority corresponds to at least one parameter belonging to the group consisting of the following parameters:
a sense of processing of the motion information items of said list, when they are represented in a referential system for which each axis corresponds to a distinct component of a motion information item;
an information item representing the number of times that a previously-selected motion information item has been preliminarily encoded, called a frequency of appearance;
an information item representing a degree of confidence associated with a piece of information on motion;
a combination of the preceding parameters.

6. The method according to claim 5, wherein said sense of processing belongs to the group consisting of:
a spiral sense of processing,
a diamond-shaped sense of processing,
a sense of processing that takes account of at least one position, in said referential system, of said motion information items,
and wherein said sense of processing is centered on a predetermined motion information item or on a barycenter of said motion information items of said list.

7. The method according to claim 1, wherein said building step takes account of a number of reference images.

8. The method according to claim 1, wherein said signal furthermore carries at least one information item representing a number of reference images.

9. A method for decoding at least one current block of a current image of a sequence of images, wherein said method comprises the following steps:
receiving and decoding an encoded motion information item, delivering a decoded motion information item;
processing said decoded motion information item, wherein processing comprises:
a step of building, with a processing device, at least a list comprising motion information items, including at least one previously-selected motion information item, coming from a prediction by motion compensation on the basis of at least one reference image and having been preliminarily encoded, and at least one non-previously-selected motion information item, not preliminarily encoded;
a first step of associating, with the processing device, at least one previously-selected motion information item of said list with a motion information item of said list, called a motion information item to be encoded, said first step of associating being implemented according to a first rule of optimization of the cost of encoding said motion information item to be encoded and delivering a modified list comprising at least one association; and
a second step of associating, with the processing device, each non-previously-selected motion information item of said list not associated during said first step of associating, with a motion information item to be encoded identified among said non-previously-selected motion information items not associated during said first step of associating and said previously-selected motion information items associated during said first step of associating, said second step of associating being implemented according to a second rule aimed at ensuring that each of the motion information items of said list is associated, during said first or said second type of association, with a single motion information item to be encoded, said second step of associating delivering a modified list comprising as many associations as there are motion information items in the list built during said building step;
selecting, from among said motion information items of said modified list, a motion information item associated, during said first or said second step of associating, with said decoded motion information item;
rebuilding said block from said selected motion information item.

10. A device for processing at least one motion information item pertaining to a current image of a sequence of images, wherein said device comprises:
means for building at least one list comprising motion information items, including at least one previously-selected motion information item, coming from a prediction by motion compensation on the basis of at least one reference image and having been preliminarily encoded, and at least one motion information item called an non-previously-selected motion information item, not preliminarily encoded;
first means for associating at least one previously-selected motion information item with a motion information item of said list, called a motion information item to be encoded, said first means for associating being adapted to complying with a first rule of optimizing the cost of encoding said motion information item to be encoded and delivering a modified list comprising at least one association;
second means for associating each non-previously-selected motion information item, not associated by said first means for associating, with a motion information item to be encoded identified from among said non-previously-selected motion information items not associated by said first means for associating and said previously-selected motion information items associated by said first means for associating, said second means for associating being adapted to complying with a second rule aimed at ensuring that each of the motion information items of said list is associated, by said first or second means for associating, with a single motion information item to be encoded, the second means for associating delivering a modified list comprising as many associations as the motion information items in the list built by said building means;
an encoder configured to encode at least one current block of said current image of said image sequence, wherein the encoder comprises:
means for selecting a motion information item for said current block from among said motion information items of said modified list; and
means for encoding a motion information item to be encoded associated, by said means of said processing device, with said selected motion information item selected by said means for selecting.

11. A device for decoding at least one current block of a current image of a sequence of images, the device comprising:
means for receiving and decoding an encoded motion information item, delivering a decoded motion information item;
means for processing said decoded motion information item, wherein processing comprises:
building at least a list comprising motion information items, including at least one previously-selected motion information item, coming from a prediction by motion compensation on the basis of at least one reference image and having been preliminarily encoded, and at least one non-previously-selected motion information item, not preliminarily encoded;
a first step of associating at least one previously-selected motion information item of said list with a motion information item of said list, called a motion information item to be encoded, said first step of associating being implemented according to a first rule of optimization of the cost of encoding said motion information item to be encoded and delivering a modified list comprising at least one association;
a second step of associating each non-previously-selected motion information item of said list not associated during said first step of associating, with a motion information item to be encoded identified among said non-previously-selected motion information items not associated during said first step of associating and said previously-selected motion information items associated during said first step of associating, said second step of associating being implemented according to a second rule aimed at ensuring that each of the motion information items of said list is associated, during said first or said second type of association, with a single motion information item to be encoded, said second step of associating delivering a modified list comprising as many associations as there are motion information items in the list built during said building step;

means for selecting, from among said motion information items of said modified list, a motion information item associated with said decoded motion information item by said first or second means for associating;

means for rebuilding said block from said selected motion information item.

12. A non-transitory computer-readable medium comprising a computer program stored thereon and comprising instructions for implementing a method of processing at least one motion information item pertaining to a current image of a sequence of images, when this program is executed by a processor, wherein said method comprises:

a step of building, with the processor, at least a list comprising motion information items, including at least one previously-selected motion information item, coming from a prediction by motion compensation on the basis of at least one reference image and having been preliminarily encoded, and at least one non-previously-selected motion information item, not preliminarily encoded;

a first step of associating, with the processor, at least one previously-selected motion information item of said list with a motion information item of said list, called a motion information item to be encoded, said first step of associating being implemented according to a first rule of optimization of the cost of encoding said motion information item to be encoded and delivering a modified list comprising at least one association;

a second step of associating, with the processor, each non-previously-selected motion information item of said list not associated during said first step of associating, with a motion information item to be encoded identified among said non-previously-selected motion information items not associated during said first step of associating and said previously-selected motion information items associated during said first step of associating, said second step of associating being implemented according to a second rule aimed at ensuring that each of the motion information items of said list is associated, during said first or said second steps of association, with a single motion information item to be encoded, said second step of associating delivering a modified list comprising as many associations as there are motion information items in the list built during said building step;

encoding at least one current block of said current image of said sequence of images, comprising:

selecting a motion information item for said current block from among said motion information items of said modified list; and encoding a motion information item to be encoded associated, during said first or said second step of associating, with said motion information item selected during said step of selecting, delivering a motion information item encoded for said block; and generating a signal representing said at least one encoded block of said current image of said sequence of images, wherein said signal carries said encoded at least one motion information item.

* * * * *